Figure 1:
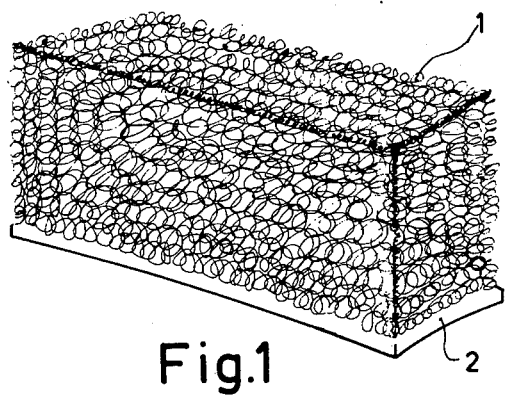

United States Patent [19]

Lersmacher et al.

[11] 4,024,226

[45] May 17, 1977

[54] METHOD OF MANUFACTURING A POROUS CARBON BODY

[75] Inventors: Bernhard Lersmacher; Siegfried Nerche; Karlheinz Schelhas, all of Aachen, Germany

[73] Assignee: U.S. Philips Corporation, New York, N.Y.

[22] Filed: Nov. 10, 1975

[21] Appl. No.: 630,300

[30] Foreign Application Priority Data

Nov. 9, 1974 Germany .................... 2453204

[52] U.S. Cl. .......................... 423/449; 264/29.1; 423/445; 427/228
[51] Int. Cl.² ........................................ C01B 31/02
[58] Field of Search ............... 423/449, 445, 448; 264/29, 29.1; 427/228

[56] References Cited

UNITED STATES PATENTS

| | | | |
|---|---|---|---|
| 3,387,940 | 6/1968 | McHenry et al. | 423/445 |
| 3,446,593 | 5/1969 | Moutaud | 423/449 |
| 3,574,548 | 4/1971 | Sands et al. | 423/449 |
| 3,666,526 | 5/1972 | Ettinger et al. | 428/539 X |
| 3,922,334 | 11/1975 | Marek et al. | 423/445 |
| 3,927,186 | 12/1975 | Viton et al. | 423/449 X |

FOREIGN PATENTS OR APPLICATIONS 6,815,254   4/1970   Netherlands ................ 423/445

*Primary Examiner*—Edward J. Meros
*Attorney, Agent, or Firm*—Frank R. Trifari; Norman N. Spain

[57] ABSTRACT

A foamed synthetic body is impregnated with a resin which can be converted into vitreous carbon by heating, after which by raising the temperature the body is dried and the resin is hardened, after which, if desired, one or more surfaces of the body are again treated with the impregnating agent and the body is then carbonized by further rise in temperature. In order to ensure that the foamed synthetic body remains stable during the whole preparation, the body is soaked with liquid epoxide resin or an aqueous polyvinyl alcohol solution before impregnation.

6 Claims, 5 Drawing Figures

METHOD OF MANUFACTURING A POROUS CARBON BODY

The invention relates to a method of manufacturing a fully or partly porous body from vitreous carbon, in which a foamed synthetic body is impregnated with a resin which can be converted into a vitreous carbon by heating, after which the body is dried by raising the temperature and the resin is hardened, after which, if desired, one or more surface of the body are gain treated with the impregnating agent and the body is then carbonized by a further rise in temperature.

Such a method is known from the Dutch published Patent Application No. 6,815,254 in which it is furthermore stated that the bodies manufactured in this manner have a high mechanical rigidity and good heat insulating properties although they have only a small volumetric weight due to thin cell walls and large pore volume. The bodies can withstand high temperatures, corrosion and oxidation. They are so hard that they can be worked only with carborundum and diamond tools. The bodies may also be manufactured so as to gastight. On the basis of these properites, fully or partly porous material from vitreous carbon may be used, for example, as a light-weight structural material in building aeroplanes, in space research as a heat shield, in technology as a insulation material and as a building material for high-temperature-resistant apparatus and corrosionresistant filters.

As foamed synthetic materials are used, for example, those of polyurethane (Dutch published Patent Application No. 6,815,254) or polyolfin (German Auslegeschrif No. 1,216,174). The cell wall thickness of the foamed synthetic material is between 10 and 100 um; the pore diameter is between 0.5 and 1 mm. the foamed synthetic material should be permeable to low-viscous liquids, so it should have at least partly an open pore structure. As impregnating agents serve, for example, phenolformaldehyde resins, cresol resins, furane resins or mixtures of these resins.

After hardening, the temperature is further increased; the conversion into vitreous carbon is completed at temperatures of approximately 1000° C; however, the temperature may also be increased to approximately 3000° C. According to the Dutch published Patent Application 6,815,254, the increase in temperature may as a rule be from 10 to 100° C per hour.

As compared with foamed carbons, which are manufactured by pyrolytic decomposition of highly porous foamed synthetic materials, the porous bodies of vitreous carbon thus manufactured have essentially better properites. Actually, foamed carbons have such a low mechanical stability that in practice they must be used only as a thermal insulation material. For this purpose also the possibilities of application are very restricted, since the material rather rapidly deteriorates to a powder already under the influence of low mechanical loads, as they always occur, for example, with temperature fluctuations (Chem. Ing. Techn. 42 (1970) 659–669). It has therefore been endeavored frequently to mitigate the drawback or foamed carbons.

For example, it is known from United States Patent Specification No. 3,387,940 to add finely divided carbonaceous fillers, for example graphite flour, soot or ground pitch, to a polyurethane foam to be carbonized, during its manufacture. For this purpose the fillers are dispersed in liquid carriers, for example, in liquid epoxide resins or phenol resins.

According to British patent specification No. 1,167,197, a body of organic foam, for example of polyurethane, polystyrol or cellulose, is saturated with a binder, then decomposed normally to carbon and finally coated with graphite or a referactory metal by pyrolytic deposition from the gaseous phase. As binders serve phenol resins or epoxide resins or the binders mentioned in the U.S. Pat. No. 3,111,396, which also include polyvinyl alcohol. In this case it is not endeavored to manufacture a porous body of vitreous carbon, for polyvinyl alochol cannot be converted into vitreous carbon.

The formed carbons manufactured according to the two last-mentioned methods cannot compete with the porous bodies of vitreous carbons mentioned in the preamble partly by their cumbersome method of manufacture and partly already by the fact that they do not show the favourable properties of vitreous carbon mentioned in the preamble.

However, the method of manufacturing porous bodies of vitreous carbon mentioned in the preamble has certain drawbacks which occur in particular in the manufacture of bodies having lengths of more than 1 cm. Upon impregnating, the resins start to dissolve the foam so that the danger exists that the foam collapses. The dissolving is still stimulated as a relut of the initial decrease of the viscosity of the resin due to the heating necessary for hardening. The viscosity increases again only when the polycondensation of the impregnating agent starts. The increase usually occurs in such a delayed manner that the collapse of the foam cannot be prevented.

The dissolving endangers in particular the stability of soft polyurethane foam the cells of which are not separated by diaphragms, but which consists of a structure of webs.

It is the object of the invention to ensure in the manufacture of porous bodies from vitreous carbon that the foamed body of synthetic material remains stable during the whole preparation.

According to the invention this is achieved in that, prior to the impregnation, the body of foamed synthetic material is soaked with liquid epoxide resin or an aqueous polyvinyl alcohol solution.

As a liquid epoxide resin may be used, for example, the commerical product "Araldit" D (CY230) with the associated hardener HY 951 of CIBA AG. This product is a solvent-free liquid epoxide described in publication nr. 32570/d/1 of CIBA AG, Switzerland. For purposes of reducing the viscosity, the epoxide resin may be diluted with a solvent or emulsifier which does not dissolve the foamed synthetic material or dissolves it only slightly, for example, with methanol-petrol mixtures (methanol : petrol = 1 : 1).

As a polyvinyl alcohol may be used, for example, the commerical product "Moviol" of Farbwerke Hoechst AG. This product is a polyvinyl alcohol described in Roemps, Chemie-Lexikon, 5th — reprint, Column 3322, Stuttgart 1962. The aqueous soaking solutions preferably contain from 1 to 10% by weight of polyvinyl alcohol. Owing to the fact that said solutions at room temperature are nearly gel-like, fine-pore foams can be soaked with difficulty only, since a partial sealing of the pores occurs very rapidly and hence a uniform soaking is not possible. It is therefore advantageous to dissolve the polyvinyl alcohol in water heated to 80° to 90° C and to soak the foam with this hot solution. Upon cooling the gellation occurs rapidly and hence a homogeneous stabilisation is obtained. It is furthermore advantageous to wet the foamed body internally before soaking with polyvinyl alcohol solution, for example, by squeezing under hot water ( ≥ 50° C). As a result of this a noticeable increase of the "wettability" is obtained.

Summarizing, the method according to the invention runs off as follows:

As starting materials are used:

a. Synthetic, foamed high polymers on the basis of polyurethane (polyether or polyester/isocyanate synthetic materials) whose pores constitute a system of intercommunicating ducts (open-pore foams).

b. Irreversibly hardening synthetic resins, so called Duromers or Duroplasts, in particular those on the basis of phenol/cresol and formaldehyde, in the form of moulding resins or also mixed with or dissolved in furfuryl alcohol. Furthermore phenol-resols, phenol-Novolaks, polymides (in which there is impregnated with monomers), petroleum pitches and PVC pitch. An essential condition for this group of materials is that they can be converted into vitreous carbon by carbonisation.

c. Aqueous polynivyl alcohol solutions or epoxide resins in a pure form as well as a diluted solution, as already explained above.

In the method according to the invention, the above-mentioned starting materials are subjected to the following treatment steps:

1. The polyurethane foam mentioned sub (a) which serves substantially as a support is first soaked by means of one of the materials and solutions, respectively, mentioned sub (c) and is then subjected to a thermal tretment. The temperture to be used as well as the duration of the pre-treatment is to be varied in accordance with the type of soaking agent.

The soaking may be carried out in various manners, for example, by dipping, by vacuum impregnation, by spraying, and so on. It may be carried out in a single cycle or in a multiple cycle.

In this process step which is referred to as stabilisation, the polyurethane foam serving as a support is coated with a thin, hardened, rigid foam which coheres as readily as possible and consists of a substantially insoluble and unfusible "resin". As a result of this the foam is fixed, tht is, its pore configuration is substantially maintained, it becomes substantially insoluble and loses substantially the character of a thermoplastic synthetic material which in general is natural for open-pore polyurethane foams.

2. The activities of the impregnation of the foam are similar to those of tahe stabilisation but in this case the impregnating agents mentioned sub (b) are used which in general are prepared essentially more viscously than the stabilisation agents but which are preferably diluted to such an extent as to form an adhering skin on the stabilisation agent. When mixtures with furfuryl alcohol are used, the latter is slightly precondensed by the addition of catalysts, so as to increase the viscosity of the impregnating agent. The quantity of impregnating agent used and solidified by thermal hardening determines the density and hence a series of properties of the final product.

3. The process steps (1) and (2) produce a rigid porous body which can be converted in a preliminary stage of the product manufacuted according to the invention in process step referred to as sealing. Sealing means that the rigid porous body is sealed on its outer surface either fully or partly with the impregnating agent, hence is sealed free from pores. Sealing may be carried out in various manners:

3.1. Upon sealing by dipping, the part to be sealed of the porous body pretreatad accroding to (1) and (2) is laid or suspended in a container having impregnating agent (b), for example, with butylated phenol-resol. The butylation produces a reduction of the "inner" reactivity of the resin and hence an elongation of the B time (gel time), so of the processing time and processing temperature up to the quantitative hardening. The dipping depth should be chosen to be so that the thickness of the dense sealing layer does not exceed a value of approximately 4 to 5 mm. Said maximum layer thickness represents an upper limited due to the subsequent carbonisation process. (Of course, a thicker layer may also be provided upon sealing, but before the carbonisation said layer should be reduced to the critial thickness of approximately 4 to 5 mm.)

When the dipping depth is adjusted by sufficient fixing of the porous part and the impregnation bath, the latter may be hardened either thermally or by the addition of hardening catalysts. In this manner a composite body is obtained which on its outer face (surface) consists entirely or partly of dense polymeric material, and in the remaining parts of polymeric foam.

If desired, the dipping method may also be replaced in that the outer surface of the porous support is partly or fully sealed by spraying, painting or the like.

The sealing may also be carried out so that the phenol resin used for sealig is precondensed by thermal pretreatment to such an extent as to become extremely viscous but not yet hardened. The rheological condition approaches approximataely that of a very rigid, jelly-like, elastic material. The hardened, that is stabilized and impregnated, foam may be pressed in the thus pretreated resin. The gellated resinous mass of the sealing agent forces itself into the outer pore layer. When a short after-treatment at approximately 80° to 90° C is then carried out, the pressed resinous mass becomes viscous again and solidifies upon cooling to a homogenous crack-free layer which is ridgidly locked in the porous foam. By directed temperature-time treatment to approximately 140° C the residual hardening is then carried out prior to carbonization.

3.2. Another possibility of rigidly connecting together porous and dense components of the composite body to be prepared consists in the method referred to hereinafter as combination method. The elements to be combined (porous and dense) are not hardened quantitatively so that they still maintain a certain residual activity (polymerisability). (In the chemistry of the duroplastic synthetic materials said condition would be referred to approximately as "Resitol". The components are contacted in the desired manner and are then subjected to a thermal after-treatment.

4. When the constituents of the product to be manufactured according to the invention have been bonded in a manner which corresponds to the method step of 3.1 or 3.2 or a method comparable therewith, carbonisation may be carried out which results in the final product. For that purpose, the polymeric composite body prepared according to the above method should be heated according to a particular time programme in an insert atmosphere or in a vacuum at least to 800° C, preferably, however, higher than approximately 1600° C, in particular cases even up to 2500° C or 3000° C. The carbonisation process should in all phases correspond to the requirement of the pyrolysis of high-polymeric solids. This has been described so elaborately that a detailed description is superfluous here.

The composite body manufactured according to the invention consists of solid and high-porous parts of vitreous carbon. The transition from "solid" to "porous" occurs more or less continuously (or also discontinuously) in accordance with the type of preparation. In addition to the properties of its components, as already said in the preamble, the composite body combines a few particular charcteristics. For example, as regards material it is homogeneous, although structurally it is very inhomogeneous. Thus, for example, there are no differences in the coefficients of thermal expansion of the two components as is usually the case in conventional composite systems. This is of decisive importance for the typical high temperature material of vitreous carbon. The composite material according to the invention also enables the construction of thick-walled parts and apparatus of vitreous carbon. According to the needs, the very stable compact phase or also the porous phase may also be used for the provision of connections or bondings to other structural elements.

It has furthermore been found that for the porous bodies and composite bodies manufactured according to the invention there exists an additional advantageous application possibility in addition to the application possibilities already mentioned in the preamble, namely as a material for tools for the hot working of glass.

The many manual working operations in a glass blowing plant include the formation of softened glass or quartz glass to bodies having flat surfaces. As an example may be stated the provision of, for example, a square end at a round rod. The tool which is used advantageously in this case is a so-called squeezer. These commercially available tools generally consist of metal (mainly brass) and in special embodiments they comprise riveted pressure jaws of brass or graphite.

The invention application according to the invention relates to tools of the said type which distinguish from the type used so far in that its parts contacting the softened glass or quartz glass consist of vitreous carbon of different form.

As already described above, vitreous carbon as a material for the hot working of glass has a series of advantages as compared with conventional materials, including in particular the considerably higher life in certain processes of the glass working. It has now been found that in intermittent processes, so for more or less short contacts between hot glass and tool, interrupted by cooling, the better properties of the porous vitreous carbon manufactured according to the invention are most obvious. The tool armoured according to the invention is used substantially exclusively "intermittently" in the described way.

In addition to the general advantages presented by the use of vitreous carbons, a fully decisive improvement which can be achieved with the total armoured according to the invention may be described as follows: when a softened glass is given a flat surface by means of a so far used tool, said surface, after solidification of the glass, is generally more or less strongly "crushed" or "corrugated". When a tool armoured with porous vitreous carbon is used, said "undulation" effect is considerably reduced. When an armouring is used consisting of the composite member according to the invention, even surfaces of nearly optical quality are obtained as they could so far not be achieved in such a simple operation.

In the above-mentioned use the necessity frequently occurs to connect vitreous carbon to a support in a "laminar" manner.

The technique of connecting rigid carbon to other materials is known in principle. Most methods of this kind are based on special soldering methods in which carbide formers such as Zr, Ti, Ta, Si and so on are used as a soldering metal either alone or in combination with a ductile component, for example, Ag, Au, Cu, Pt. For the selection of suitable solders are of importance mainly the partners to be combined, so, for example, solid carbon-ceramic, solid carbon-metal, the type of carbon, so for example electrographite, pyrolytic graphite, diamond, vitreous carbon, as well as the type of requirements which are imposed upon the composite members. For example, in the case of high mechanicaL requirements and negligible thermal load, a different type of connection will be used than in the case of a short-lasting or also long-lasting thermal load. There are a plurality of types of requirements to which the bonding method and bonding material should be adapted.

It is to be noted that in most of the cases in which solid carbon occurs as one partner of the composite body, the bond itself is mainly subjected to thermal loads in practice. It is further obvious that there is little known about connections of vitreous carbon to other materials or carriers due to the relative novelty of the former and its so far restricted application possibilities. Applicants' experiments carried out so far have proved that temperature-resistant connections ($T \gg 500°$ C) of parts having a small size, but in particular a small area, of vitreous carbon ($F \approx 1cm^2$) to other materials can generally be manufactured in a simple manner (meant in particular are soldered joints).

In the manufacture of temperature-resistant connections of large area ($F \gg 100$ cm$^2$) by means of soldering, however, considerable difficulties occur. These consist in particular in the necessity of heating parts to be connected to uniform, generally high temperatures ($\geq 1000°$ C). Due to the oxidation of the material, said method should be carried out in an inert atmosphere or in a vacuum.

In addition, said high temperatures should usually be maintained for a considerable period of time ($\geq$ a few hours), because the connection process, at least on the side of the carbon, is determined by diffusion. The difficulties of perfect connections by means of high temperature soldering become particularly large when the parts to be connected do not only have large areas but also complicated geometries.

It has been found that for the manufacture of a heat-resistant, mechanically stable bond between bodies of which one consists of vitreous carbon, silicon resins (polysiloxanes), in particular those on the basis of phenyl methyl siloxane, are excellently suitable as a connection material. The use of silicon resins as a connection material has the advantage that its temperature resistance is considerably higher than that of other organic polymers. It could be observed that the siloxanes during operation even increase their connection stability under the thermal load. For short-lasting loads the "natural" stability is sufficient. The wettability of vitreous carbon by the polysiloxanes is also advantageous.

The invention will now be described in greater detail with reference to embodiments and a drawing.

EXAMPLE 1

A cylinder of polyurethane foam of 60 mm diameter and 253 mm length, having an average pore diameter of approximately 2 mm, weight 19.45 g, was soaked with Araldit D (CY 230) plus 9% hardener HY 951 and hardened in a furnace at approximately 70° C. The cylinder thus stabilized had a diameter of 60 mm, a length of 295 mm and a weight of 175.5 g.

The stabilized cylinder was then impregnated three times successively with a solution of 50 g of phenol-resol resin in 50 ml of methanol and hardened. After the third impregnation and hardening, the weight was 495.2 g and the density of the foam 0.465 g/cm$^3$.

The cylinder was then carbonized by heating up to 1600° C in a furnace. After that the weight was 103.47 g and the electric resistance <1 Ohm. The cylinder has shrunk to a diameter of 39 mm and a length of 208 mm.

EXAMPLE 2

In a manner analgous to that of Example 1, a body was manufactured which consists of a block 1 of foamed material of which one outer surface is sealed with a layer 2 of vitreous carbon in a thickness of approximately 2 to 3 mm (FIG. 1). The starting foam was a polyurethane foam having an average pore diameter of approximately 2 mm. The stabilisation was carried out with epoxide resin diluted with methanol/petrol 1 : 1, the impregnation occurred with a solution of phenol-resol in methanol, the sealing was carried out in a mixture of phenol-resol ad prepolymerized furfuryl alcohol.

EXAMPLE 3

Figure 2:
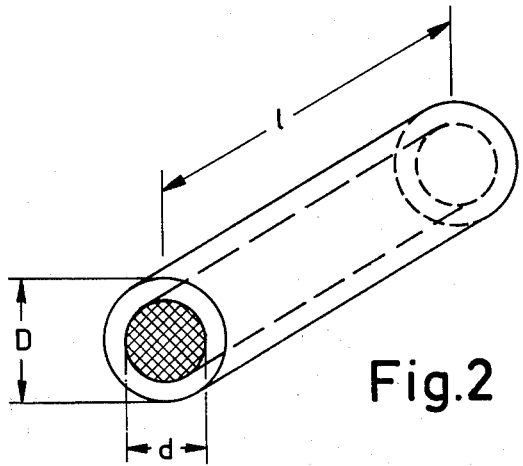

A tubular composite member (FIG. 2) was sealed according to the combination method. Its dimensions were:

D: 16.5 mm
d: 11.5 mm
l: 100 mm.

As starting materials were used:
For the tube jacket a phenol resol, mixed with furfuryl alcohol in the ratio 4 : 1. For the core a polyurethane foam having an average pore diameter of approximately 0.5 mm. Stabilisation and impregnation agents as in Example 1.

A strength test (crushing of rod section of approximately 8 mm length) yielded the following values: fracture test F = 59 kg. For comparison: a similar ring of vitreous carbon, without foam core: F = 21 kg. Rings of the same dimension of quartz glass: F = 10 – 13 kg.

EXAMPLE 4

Example 1 was repeated with the condition that as an impregnating agent was used a mixture of
100 parts of phenol-resol resin techn. with 20% solvent and monomer content, that is 80% resin body, initial viscosity 5000 cP
25 parts of monomeric furfuryl alcohol and
125 parts of methanol/petrol (1 : 1).

EXAMPLE 5

Example 1 was repeated with the condition that 10 g of polyvinyl alcohol were dissolved in 300 ml of water heated to 80° C. The foam was soaked with this hot solution, dried in air for 15 hours and then in a furnace at approximately 80° C for 5 hours.

EXAMPLE 6

The stabilisation according to Example 5 was repeated with foamed bodies having different pore sizes. The increase in weight achieved are recorded in the following Table.

| | coarse-pore foam pore diameter 1–2 mm | | | fine-pore foam pore diameter appr. 300 μm | | |
|---|---|---|---|---|---|---|
| Sample No. | 1 | 2 | 3 | 1 | 2 | 3 |
| weight gr after one stabilisation with PVA | 4.02 | 4.18 | 3.94 | 1.86 | 1.73 | 1.67 |
| after two soakings with 10 g PVA per 300 ml of H$_2$O | 4.88 | 5.30 | 5.15 | 3.23 | 2.73 | 2.75 |
| | 5.42 | 5.90 | 5.74 | 8.15 | 5.25 | 7.70 |

EXAMPLE 7

Sealing with butylated phenol-resol
With the butylated resol it deals with a phenol resin which is reduced in its reactivity. Said resin may be precondensed to such an extent as to assume a nearly rubber-like consistence.

Figure 3:
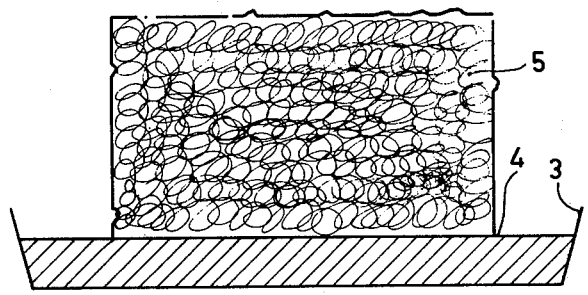

The hardened foam may be forced into such a rubber-like layer (for example as a bottom coating of a container) and in this manner a sealing is also obtained, since with a thermal after-treatment to, for example, 140° C the rubber-like consistence changes into the usual hardeness. FIG. 3 illustrates the method. In a container 3 (impregnated with a separating agent, for example Teflon Polytetrafluorethylene) the butylated phenol-resol 4 is present which has been transferred by careful thermal treatment, for example at 80° C, from its original liquid (viscous) state into the said gel-like or nearly rubber-like state. The stabilised and/or impregnated hardened foamed body 5 is forced in said mass. The jelly like "skin" 4 adheres in the pores. When a termal after-treatment is then carried out, the "skin" 4 is finally hardened and the composite member as a starting material for the next process step, namely the carbonisation, is obtained.

EXAMPLE 8

A sealed surface of a composite member of vitreous carbon, diameter approximately 110 mm, thickness 3 mm, was cleaned, degreased and then painted with a thin layer (0.1–0.2 mm) of the polymethylsiloxane resin silicon resin P 200 of Bayer AG (dissolved in xylene). In the same manner a support of noble steel was prepared. The two components were than laid on each other with the "resin side", fixed against sliding and subjected to a particular thermal treatment (3 hours 70° C, than 4 hours 130° C, then 24 hours 230° C, then cooling to room temperature) under a light pressure (few g/cm$^2$).

It has been found that in the manner described a mechanically extremely rigid, water-insensitive bond can be produced.

In this manner, a combination of vitreous carbon-stainless steel was produced for a machine which serves for the automatic manufacture of lamp envelopes. The size of the surface to be bonded was approximately 100 cm². In the said machine the composite body is to serve as a feeder for a melted portion of glass to a blowing device. Said feeder contacts the melted glass (~1000° C) for a short period of time (~0.1 sec) in an intermittent operation (sequency approximately 1 sec).

EXAMPLE 9

Figure 4:
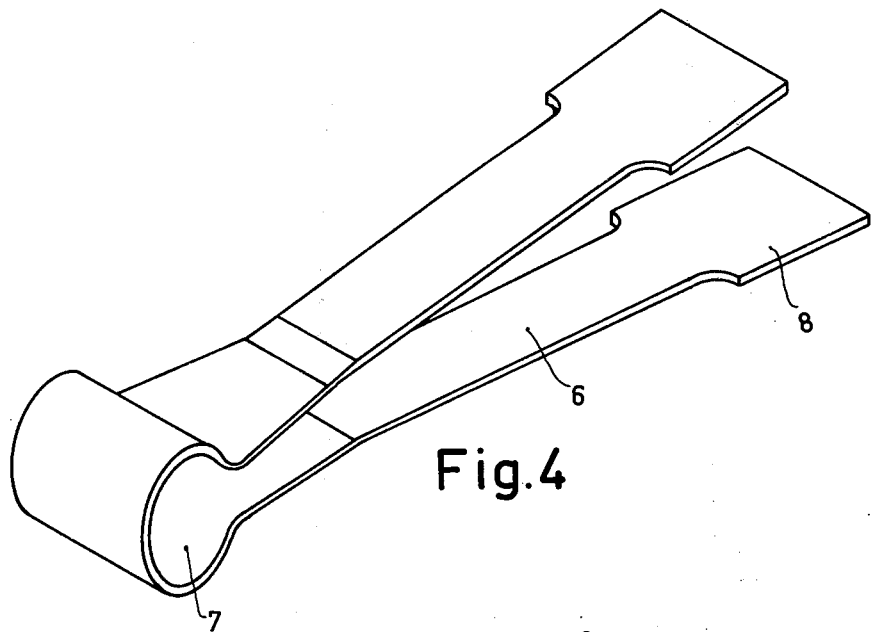

Squeezers for the glass blowing plant of which one embodiment is shown in FIG. 4, may be described as follows:

The squeezer itself consists of metal, preferably of stainless steel. The resilient brace 7 connecting the two limbs 6 consists of stainless steel or spring steel and is slightly thinner ($d \approx 1$ mm) than the jaws 8 ($d \approx 3$ mm) serving as grips. The resilient brace is welded or riveted to the jaws 8.

Figure 5:
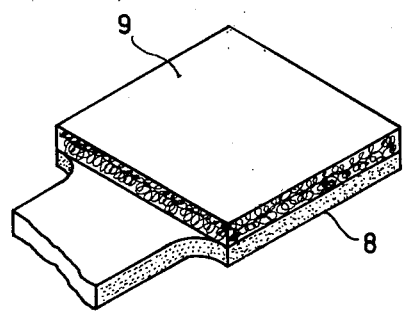

The jaws 8 of the aqueezer are armoured with vitreous carbon (FIG. 5) namely with composite plates 9 consisting of compact vitreous carbon as a cover layer on a support of porous vitreous carbon, so-called carbon foam.

The connection of the parts of vitreous carbon to the jaws of the squeezer may be effected by riveting, soldering or adhesion. In the case of the squeezer, the above-explained adhesion technique with polysiloxane resins has proved to be particularly suitable.

What is claimed is:

1. In the method of forming a porous carbon body wherein a foamed polyurethane body is first impregnated with a resin convertable to vitreous carbon upon heating and the resultant impregnated foamed body is first heated to drying, further heated to a temperature sufficiently high to harden the body and then heated to a temperature sufficiently high to cause the resultant impregnated polyurethane foamed body to be carbonized, the improvement wherein prior to the step of impregnation the foamed polyurethane body is soaked with a liquid epoxide resin or an aqueous polyvinyl alcohol solution.

2. The method of claim 1 wherein epoxide resin is employed in a solvent capable of most of having only a slight solvent effect on the foamed polyurethane body.

3. The mthod of claim 1 wherein, after hardening, at least one surface of the body is treated with the resin convertable to vitreous carbon.

4. A method as claimed in claim 1, characterized in that the body is soaked with an aqueous polyvinyl alcohol solution containing from 1 to 10% by weight of polyvinyl alcohol.

5. A method as claimed in claim 4, characterized in that the polyvinyl alcohol is dissolved in water which is heated to 80° to 90° C and the polyurethane foamed body is soaked with said hot solution.

6. A method as claimed in claim 5, characterized in that the polyurethane body is internally wetted with polyvinyl alcohol solution before soaking.

* * * * *